United States Patent
Chen et al.

(10) Patent No.: US 8,537,892 B2
(45) Date of Patent: Sep. 17, 2013

(54) DETECTION OF DOUBLE VIDEO COMPRESSION USING FIRST DIGIT BASED STATISTICS

(75) Inventors: Wen Chen, Harrison, NJ (US); Yun-Qing Shi, Millburn, NJ (US)

(73) Assignee: New Jersey Institute of Technology, Newark, NJ (US)

( * ) Notice: Subject to any disclaimer, the term of this patent is extended or adjusted under 35 U.S.C. 154(b) by 592 days.

(21) Appl. No.: 12/422,138

(22) Filed: Apr. 10, 2009

(65) Prior Publication Data
US 2009/0257490 A1    Oct. 15, 2009

Related U.S. Application Data

(60) Provisional application No. 61/044,590, filed on Apr. 14, 2008.

(51) Int. Cl.
*H04N 7/12* (2006.01)
*H04N 11/02* (2006.01)
*H04N 11/04* (2006.01)
*G09G 5/00* (2006.01)
*G06K 9/36* (2006.01)
*G06K 9/46* (2006.01)

(52) U.S. Cl.
USPC ............. 375/240.08; 345/629; 382/232

(58) Field of Classification Search
USPC .................................. 375/240.08
See application file for complete search history.

(56) References Cited

U.S. PATENT DOCUMENTS 7,439,989 B2 * 10/2008 Lin et al. .................. 345/629
8,023,747 B2 *  9/2011 Shi et al. .................. 382/232

FOREIGN PATENT DOCUMENTS

WO    WO 2008/005950 A2    1/2008

OTHER PUBLICATIONS

Tudor, "MPEG-2 Video Compression", Electronics & Communication Engineering Journal, Dec. 1995.*
Lukas, J. and Fridrich J., Estimation of Primary Quantization Matrix in Double Compressed JPEG Images, Proceedings of DFRWS 2003, Cleveland, OH, USA, Aug. 5-8, 2003.
Popescu, Alin C. and Hany Farid, Statistical Tools for Digital Forensics, Proceedings of the 6th Information Hiding Workshop, May 2004.
Wang, Weihong and Hany Farid, Exposing Digital Forgeries in Video by Detecting Double MPEG Compression, MM&Sec '06, Sep. 26-27, 2006, Geneva, Switzerland.
Chen & Shi, "Detection of Double MPEG Compression Based on First Digit Statistics," International Workshop on Digital Watermarking 2008, Busan, Korea.
"The Parallel Berkeley Encoder," The Berkeley MPEG Encoder, accessed at http://web.archive.org/ web/20090319070753/http://bmrc.berkeley.edu/frame/research/mpeg/mpeg_encode.html, accessed on Feb. 18, 2013, pp. 2.
Chang, C-C., and Lin, C-J., "LIBSVM: A Library for Support Vector Machines," pp. 1-39 (2001).
Fu, D., et al. "A generalized Benford's law for JPEG coefficients and its application in image forensics," Proceedings of SPIE, vol. 6505, pp. 11 (2007).
Popescu, A.C., "Statistical Tools for Digital Image Forensics," Department of Computer science, Dartmouth college, pp. 137 (2005).

* cited by examiner

*Primary Examiner* — Christopher S Kelley
*Assistant Examiner* — Hee-Yong Kim

(57) ABSTRACT

Implementations of the detection of double MPEG compression using digit based statistics are disclosed.

23 Claims, 7 Drawing Sheets

700 A computer program product.

702 A signal bearing medium.

704 at least one of
　　one or more instructions for receiving video frames of a Group of Pictures (GOP);

one or more instructions for determining a probability distribution for video frames of a GOP;

one or more instructions for comparing probability distributions to a reference distribution;

one or more instructions for determining whether the GOP corresponds to a tampered video bitstream in response to comparing the probability distributions to the reference distribution;

one or more instructions for generating a feature vector for a GOP;

one or more instructions for determining probability distributions of a first digit of a plurality of quantized coefficients of an I Frame;

one or more instructions for determining probability distributions of a first digit of a plurality of quantized coefficients of a P Frame;

one or more instructions for determining probability distributions of a first digit of a plurality of quantized coefficients of a B Frame;

one or more instructions for generating a feature vector or an average of a feature vector for an I, B and/or a P video frame;

one or more instructions for receiving a feature vector for a GOP;

one or more instructions for designating a GOP as singly or doubly compressed; or one or more instructions for applying a decision rule.

| 706 a computer-readable medium. | 708 a recordable medium. | 710 a communications medium. |

FIG. 7

DETECTION OF DOUBLE VIDEO COMPRESSION USING FIRST DIGIT BASED STATISTICS

RELATED APPLICATION

This application claims priority to U.S. Provisional patent application Ser. No. 61/044,590, filed Apr. 14, 2008, and entitled "Detection of Double MPEG Video Compression Using First Digit Based Statistics", the entire disclosure of which is incorporated herein by reference.

BACKGROUND

To assess the originality and integrity of multimedia data a variety of authentication techniques have been proposed. Among the proposed authentication techniques, digital watermarking and digital signature are two basic categories that may be classified as active detection techniques. Watermarking schemes may meet certain requirements such as fidelity that may pose more significant challenges for video media. For example, in Motion Picture Experts Group (MPEG) video, dependency among frames may cause distortion resulting from a digital watermark in an intra-coded I frame to propagate through associated predictive coded frames (P frame) and bi-directionally predictive coded frames (B frames). Furthermore, not all MPEG video frames are typically watermarked.

Because of the large quantities of data involved in video, tampered video sequences are typically encoded and stored in a compressed format, and thus tampered video will usually have been subjected to compression twice. Determining whether video has been tampered may be useful. For example, in criminal investigations, video may be considered as valid evidence if it may be shown to be an original recording of a crime scene. The detection of video double compression may play a role in originality authentication in such a scenario.

BRIEF DESCRIPTION OF THE DRAWINGS

Subject matter is particularly pointed out and distinctly claimed in the concluding portion of the specification. The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

In the drawings:

FIG. 7 is a block diagram illustrating an example computer program product; and

DETAILED DESCRIPTION

Figure 1:
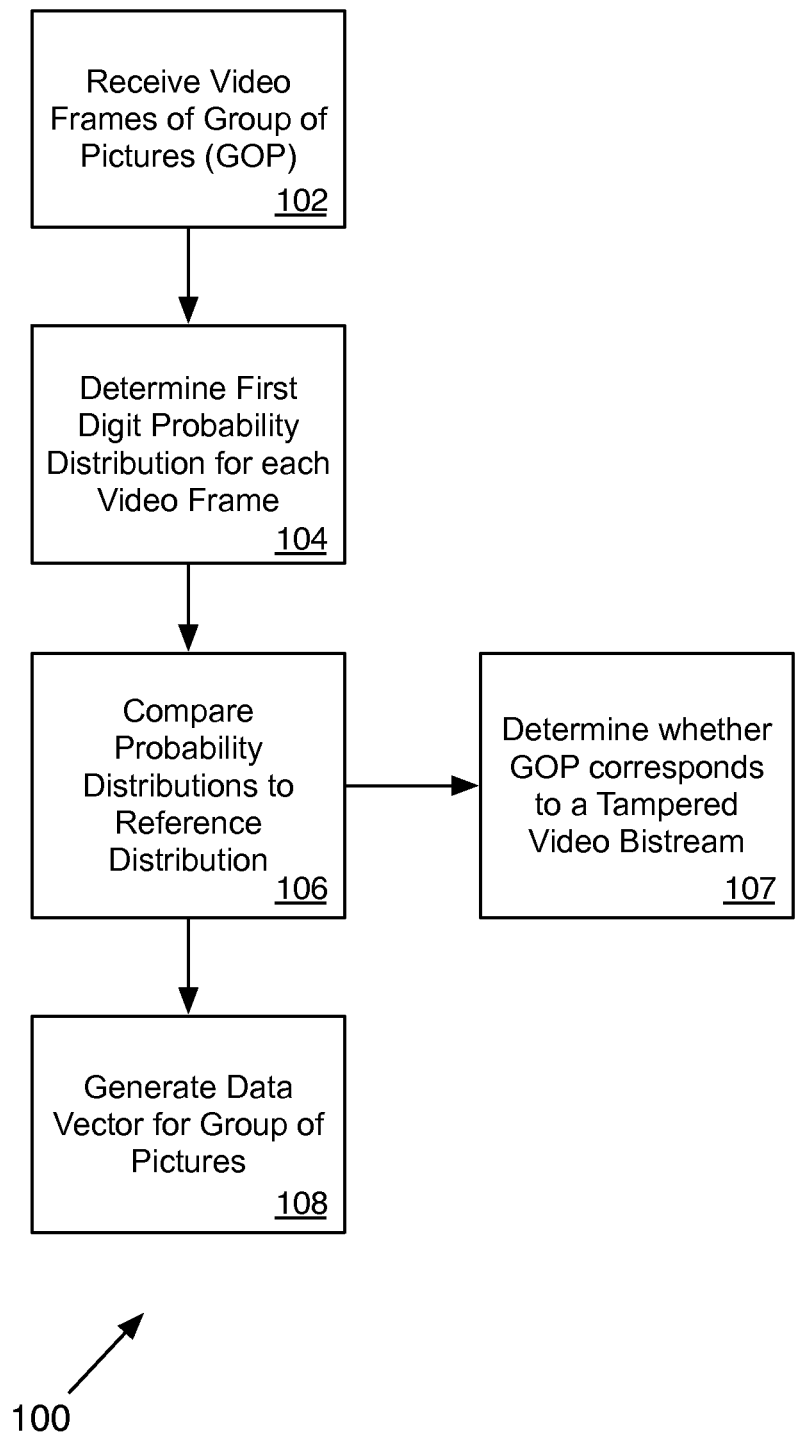
FIG. 1 is a flow chart illustrating an example process for detection of double video compression using digit based statistics.

The following description sets forth various examples along with specific details to provide a thorough understanding of claimed subject matter. It will be understood by those skilled in the art, however, that claimed subject matter may be practiced without some or more of the specific details disclosed herein. Further, in some circumstances, well-known methods, procedures, systems, components and/or circuits have not been described in detail in order to avoid unnecessarily obscuring claimed subject matter. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, may be arranged, substituted, combined, and designed in a wide variety of different configurations, all of which are explicitly contemplated and make part of this disclosure.

In the following description, algorithms and/or symbolic representations of operations on data bits and/or binary digital signals stored within a computing system, such as within a computer and/or computing system memory may be presented. An algorithm is generally considered to be a self-consistent sequence of operations and/or similar processing leading to a desired result where the operations may involve physical manipulations of physical quantities that may take the form of electrical, magnetic and/or electromagnetic signals capable of being stored, transferred, combined, compared and/or otherwise manipulated. In various contexts such signals may be referred to as bits, data, values, elements, symbols, characters, terms, numbers, numerals, etc. Those skilled in the art will recognize, however, that such terms may be used to connote physical quantities. Hence, when terms such as "storing", "processing", "retrieving", "calculating", "determining" etc. are used in this description they may refer to the actions of a computing platform, such as a computer or a similar electronic computing device such as a cellular telephone, that manipulates and/or transforms data represented as physical quantities including electronic and/or magnetic quantities within the computing platform's processors, memories, registers, etc.

This disclosure is drawn, inter alia, to methods, apparatus, and systems related to the detection of double video compression using first digit based statistics.

In accordance with the present disclosure, different types of encoded video frames of one or more Group of Pictures (GOP), such as intra-coded (I frames), predictive coded video frames (P frames) and bi-directionally predictive coded video frames (B frames), may be subjected to Variable Length Coding (VLC) decoding and distributions of digits of quantized coefficients may be determined. The distributions may then be compared to one or more reference distributions, corresponding statistical parameter values determined, and the resulting statistical values compared to threshold values to determine whether the GOP(s) includes video frames that were compressed more than once.

For example, in some implementations, the statistical distributions of the first or most significant digit of quantized coefficients of I, P and B video frame types for multiple GOPs of a video bitstream may be sampled and compared to a parametric logarithmic distribution to determine values for one or more statistical parameters. Further, in some implementations, the coefficients may be quantized AC coefficients having non-zero values.

Further, in some implementations in accordance with the present disclosure, data or feature vectors may be formed that include the determined digit based statistical distributions and associated statistical parameters and those data vectors may be used to designate corresponding GOPs as having been either singly or doubly compressed. Further, in some implementations, in accordance with the present disclosure, having designated individual GOPs of a bitstream as being either singly or doubly compressed, a decision rule may be applied to determine whether the bitstream that includes those GOPs may be designated as a tampered bitstream.

As used herein the term "video frame" may refer to any collection of data used to represent a single image or picture, or a portion of a single image or picture of a collection of such images or pictures that, taken together, forms a video sequence. Such a video sequence may be provided in a compressed format that may be subsequently uncompressed for viewing. Thus, for example, a video frame in an uncompressed format may include rows and columns of pixel values while a corresponding compressed video frame may include quantized coefficients corresponding to frequency transformed components of pixel values. For example, although claimed subject matter is not limited to particular video coding schemes or standards, a video frame may include pixel values encoded as quantized coefficients in a manner that conforms with video coding standards such as the International Organisation for Standardization Organisation Internationale de Normalisation (ISO/IEC) 13818-2 (MPEG-2) standard published October 2000, the ISO/IEC 14496-10 standard published October 2002 (MPEG-4 Part 10) and/or later versions of such standards.

In the example context of MPEG, a video bitstream may be represented as a hierarchy of six layers including: sequence, Group Of Pictures (GOP), picture, slice, macroblock and block. The video sequence top layer may include multiple GOPs and each GOP may include an I frame, multiple P frames and multiple B frames. Further, those skilled in the art in light of the present disclosure will also recognize that each of the I, P, and B video frames may include multiple non-zero quantized AC coefficients. Moreover, a quantized AC coefficient may be characterized as a number having a most significant or first digit. For example, although claimed subject matter is not limited in this regard, the most significant digit of a non-zero quantized AC coefficient may include the first digit of the coefficient's value.

An 8×8 pixel block may be used as a coding unit in MPEG. During compression, the I, P and B blocks may be first transformed into Discrete Cosine Transform (DCT) coefficients, and then quantized and subsequently entropy encoded to generate an MPEG video bitstream. During quantization, the DCT coefficients may be divided by integer quantizing values that are a product of quantization table values and quantization scales. In MPEG-1, the quantization scale may take an integer value ranging from 1 to 31. In Variable Bit Rate (VBR) encoding the quantization scale may be fixed whereas in Constant Bit Rate (CBR) encoding the quantization scale may vary at the slice or macroblock layer. Hence, if one target bit rate is used during a first CBR encoding and a different target bit rate is used during a second, subsequent, CBR encoding, the quantization scales employed in the first compression may be different than the quantization scales employed in the second compression. The differences in quantization scales used during the two compression events may result in differences in the first digit statistics between the corresponding singly and doubly compressed bitstreams.

FIG. 1 is a flow chart illustrating an example process 100 for the detection of double video compression using first digit based statistics in accordance with the present disclosure. Process 100, and other processes described herein, set forth various functional blocks that may be described as processing steps, functional operations, events and/or acts, etc., and that may be performed by hardware, software or any combination thereof. Those skilled in the art in light of the present disclosure will recognize that numerous alternatives to the functional blocks shown in FIG. 1, and other processes described herein, may be practiced in accordance with claimed subject matter.

Process 100 may include receiving, in block 102, at least some of the video frames of a Group of Pictures (GOP). Continuing to block 104, a first digit based probability distribution may be determined for each of the video frames received in block 102. At block 106, the probability distributions determined in block 104 may be compared to a reference distribution. At block 107 a determination may be made, based on the comparison undertaken in block 106, as to whether the GOP corresponds to a tampered video bitstream. Process 100 may continue to block 108, where a feature or data vector for the GOP that includes the video frames received in block 102 may be generated. Processing may be concluded after block 108.

In some implementations, block 102 may involve receiving at least some video frames of a GOP. For example, block 102 may involve receiving a plurality of video frames of a GOP where those video frames have been Variable Length Coding (VLC) decoded prior to being received at block 102.

Figure 2:
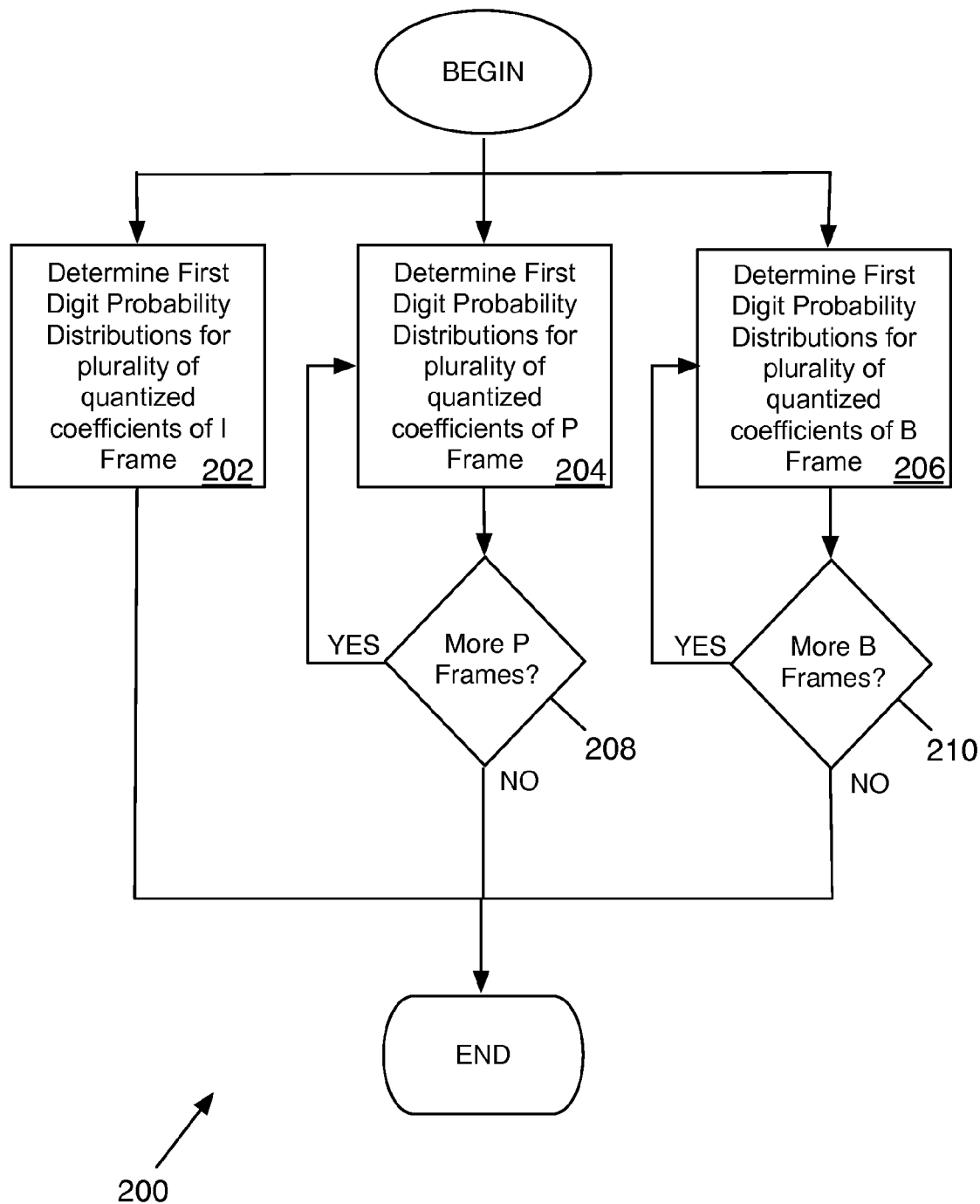
FIG. 2 is a flow chart illustrating an example process for determining a digit based probability distribution for video frames of a Group of Pictures (GOP)

FIG. 2 is a flow chart illustrating an example process 200 for determining first digit based probability distributions for video frames of a GOP in accordance with the present disclosure. For example, process 200 may be undertaken when implementing block 104 of process 100. Process 200 may include determining first digit probability distributions for a plurality of quantized coefficients of an intra-coded or "I", video frame [block 202], determining first digit probability distributions for a plurality of quantized coefficients of a predictive, or "P", coded video frame [block 204], and, determining first digit probability distributions for a plurality of quantized coefficients of a bi-directionally predictive, or "B", coded video frame [block 206].

In some implementations, the quantized coefficients may be non-zero quantized AC coefficients. In some implementations, blocks 202, 204 and 206 may involve determining probability distributions for the most significant digit of a plurality of quantized coefficients. In various implementations, the quantized coefficients of blocks 202, 204 and 206 may correspond to either luminance and/or chrominance coefficients. Further, in some implementations, determining the probability distributions of blocks 202, 204 and 206 may involve determining the number of instances, out of a total number of quantized coefficients examined, that a digit corresponding to a particular bit position of the quantized coefficients may have a particular value.

At block 208, a determination may be made as to whether additional P video frames of the GOP are to be analyzed. If one or more additional P video frames are to be analyzed then block 204 may be undertaken anew for a next P video frame to be analyzed. Similarly, at block 210, a determination may be made as to whether additional B video frames of the GOP are to be analyzed. If one or more additional B video frames are to be analyzed then block 206 may be undertaken anew for a next B video frame to be analyzed. If block 210 results in a determination that no additional frames are to be analyzed then process 200 may terminate.

While the example of process 200 includes undertaking block 202 while undertaking blocks 204 and 206, claimed subject matter is not limited in this regard and process 200 may be modified to include undertaking blocks 202, 204 and 206 in any order including undertaking blocks 202, 204 and 206 in any sequence.

Figure 3:
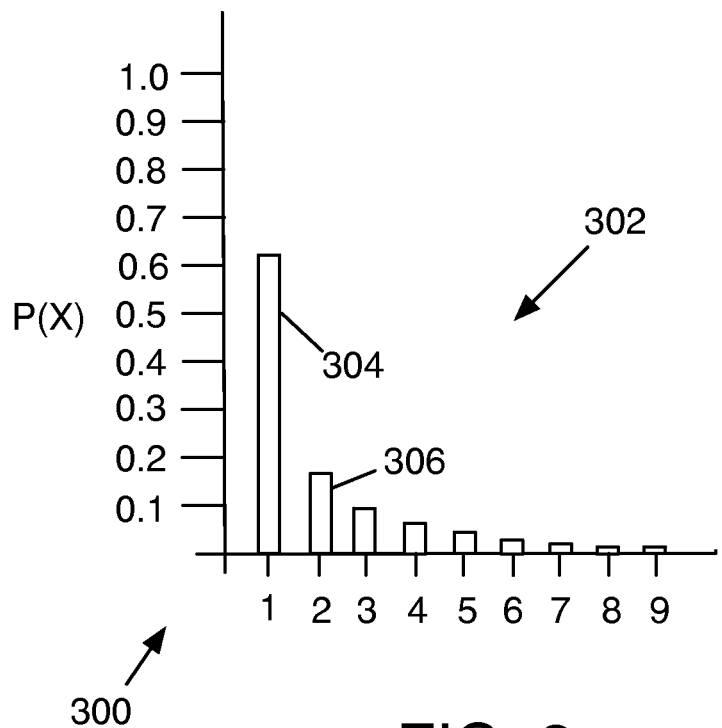
FIG. 3 is a graph illustrating an example probability distribution.

FIG. 3 illustrates an example probability distribution (P(x)) 300 of the most significant or first digit of a set 302 of one hundred example non-zero AC coefficients of an I video frame. In FIG. 3 it may be seen that probability distribution 300 for the first digit of the set 302 includes a value of 0.62 for the probability 304 that the first digit has a value of one. In other words, the value of 0.62 for the probability 304 of distribution 300 indicates that, of the set of one hundred coefficients, a total of sixty-two (62) coefficients have a value of one and the remaining thirty-eight (38) coefficients have a value other than one for the first digit. Similarly, probability distribution 300 includes a value of 0.18 for the probability 306 that the first digit has a value of two indicating that a total of eighteen (18) coefficients have a value of two for the first digit and so on. FIG. 3 has been provided herein solely for explanatory purposes and should not be construed to limit claimed subject matter in any way.

Returning to FIG. 1, block 106 of process 100 may include a comparison of the probability distributions determined in block 104 to a reference distribution. In some implementations, block 106 may involve statistically fitting the probability distribution of the respective quantized coefficients to a reference distribution. For example, although claimed subject matter is not limited in this regard, blocks 106 may involve fitting the respective digit based probability distributions to a parametric logarithmic reference distribution which may be represented by the following equation:

$$p(x) = N\log_{10}\left(1 + \frac{1}{s + x^q}\right), x = 1, 2, \ldots 9 \quad (1)$$

where x may represent the first digit of a non-zero MPEG AC coefficient, and where N, s and q are parameters that describe the distribution. Fitting the observed probability distributions to p(x) may include curve fitting the probability distributions by determining, for example, statistical parameter values corresponding to a Sum of Squares due to Error (SSE), a Root Mean Squared Error (RMSE), and/or an R-Squared value. For example, block 106 may involve determining an SSE value, an RMSE value and/or an R-Squared value for the probability distribution of the first digit of a number of non-zero MPEG AC coefficients of an I MPEG frame, determining an SSE value, an RMSE value and/or an R-Squared value for the probability distribution of the first digit of a number of non-zero MPEG AC coefficient of one or more P MPEG frames, and determining an SSE value, an RMSE value and/or an R-Squared value for the probability distribution of the first digit of a number of non-zero MPEG AC coefficient of one or more B MPEG frames.

Based upon the comparison undertaken in block 106, process 100 may continue with a determination of whether the GOP corresponds to a tampered video bitstream in block 107. In some implementations, block 107 may include comparing statistical parameter values, resulting from the comparison undertaken in block 106, to one or more threshold values. For example, in some implementations, block 106 may result in the generation of an SSE value and/or an RMSE value and that value or values may be compared, in block 107, to a threshold value of, for example, 0.05 and, if the SSE value and/or an RMSE value exceeds the threshold value then the GOP may be determined to correspond to a tampered video bitstream. Moreover, those of skill in the art, in light of the present disclosure, may recognize that in some implementations, blocks 106 and/or 107 may involve using machine learning where the threshold values may be adjusted over time.

Figure 4:
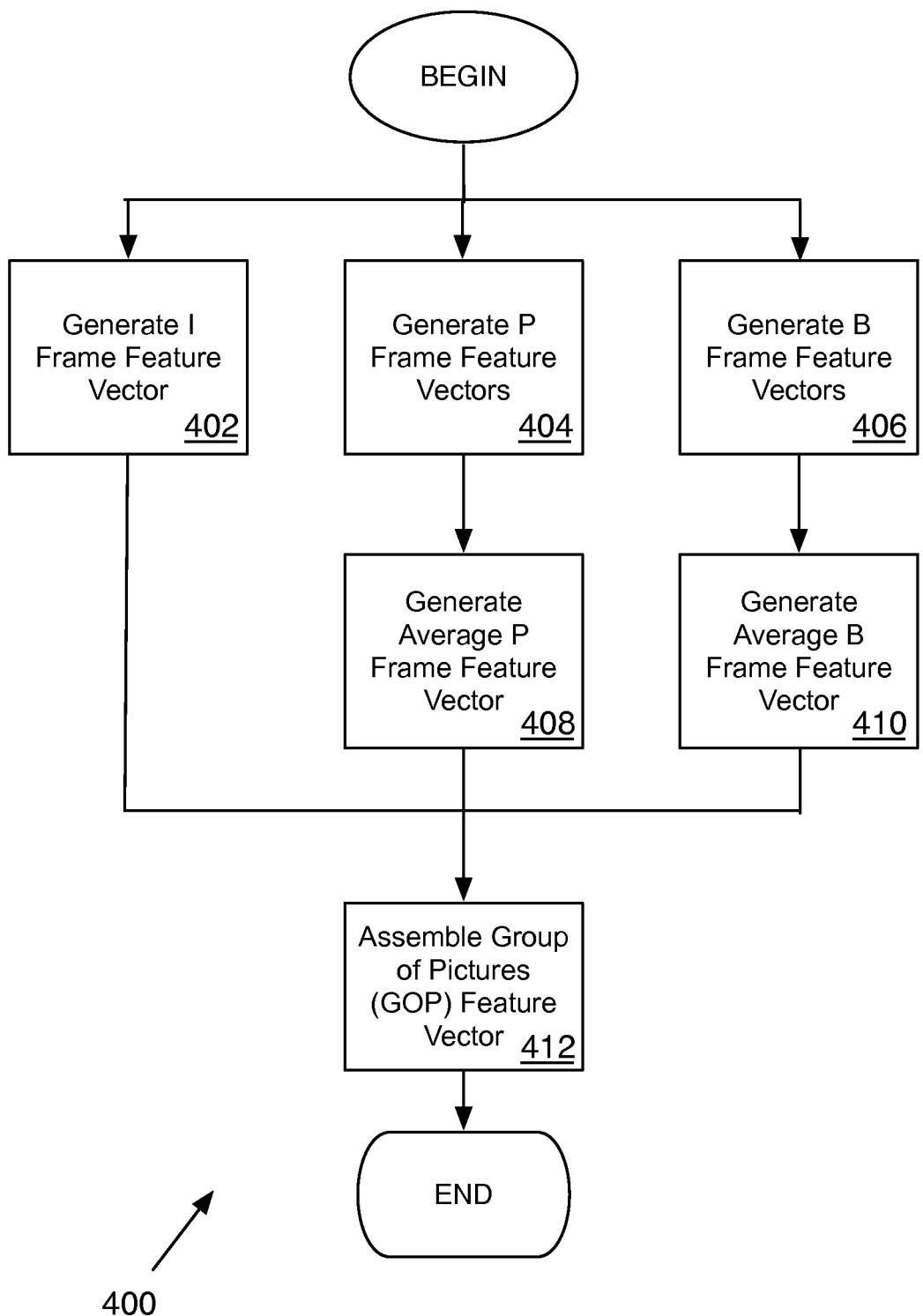
FIG. 4 is a flow chart illustrating an example process for generating a feature vector of a GOP.

The generation of a feature or data vector for the GOP that includes the video frames received in block 102 is illustrated in block 108 of process 100. FIG. 4 is a flow chart illustrating an example process 400, in accordance with the present disclosure, for generating a data or feature vector of a GOP that may be undertaken during implementation of block 108. Process 400 includes, in block 402, generating a feature vector for an I frame of a GOP. In some implementations, block 402 may involve assembling, into a data vector, the probability distribution values of the sampled digits, for example, the most significant digits, of the quantized coefficients of an I frame, and an SSE value, an RMSE value and/or an R-Squared value associated with that probability distribution.

Process 400 also includes, in blocks 404 and 406, generating respective feature vectors for one or more B frames and one or more P frames of the GOP. In some implementations, block 404 may involve assembling, into respective data vectors, the digit based probability distribution values of the quantized coefficients of one or more P frames, and SSE values, RMSE values and/or R-Squared values associated with those probability distributions. Similarly, in some implementations, block 406 may involve assembling, into respective data vectors, the digit based probability distribution values of the quantized coefficients of one or more B frames, and SSE values, RMSE values and/or R-Squared values associated with those probability distributions.

Process 400 may continue with blocks 408 and 410 corresponding to the averaging, respectively, of the feature vectors generated in blocks 404 and 406. In some implementations, blocks 408 and 410 may involve determining the mean or median of the respective feature vectors to generate an average P frame feature vector and an average B frame feature vector, respectively. For example, block 408 may include averaging together, respectively, the first digit probability distributions of feature vectors generated in the implementation of block 404, and/or separately averaging together the SSE values, RMSE values and/or R-Squared values associated with those probability distributions. Process 400 may then conclude with the assembly of a feature vector for the GOP (block 412) where the assembled feature vector includes, for example, the I frame feature vector generated in block 402 and the averaged P frame and averaged B frame feature vectors generated in blocks 408 and 410 respectively. While FIG. 4 illustrates various functional blocks as being arranged in sequence or in parallel, claimed subject matter is not limited in this regard and various functional blocks of process 400 may be undertaken in different order than illustrated. For example, while FIG. 4 illustrates blocks 402, 404 and 406 as occurring in parallel, the subject matter of process 400 may also be implemented such that, for example, blocks 402, 404 and 406 occur in any sequence.

Figure 5:
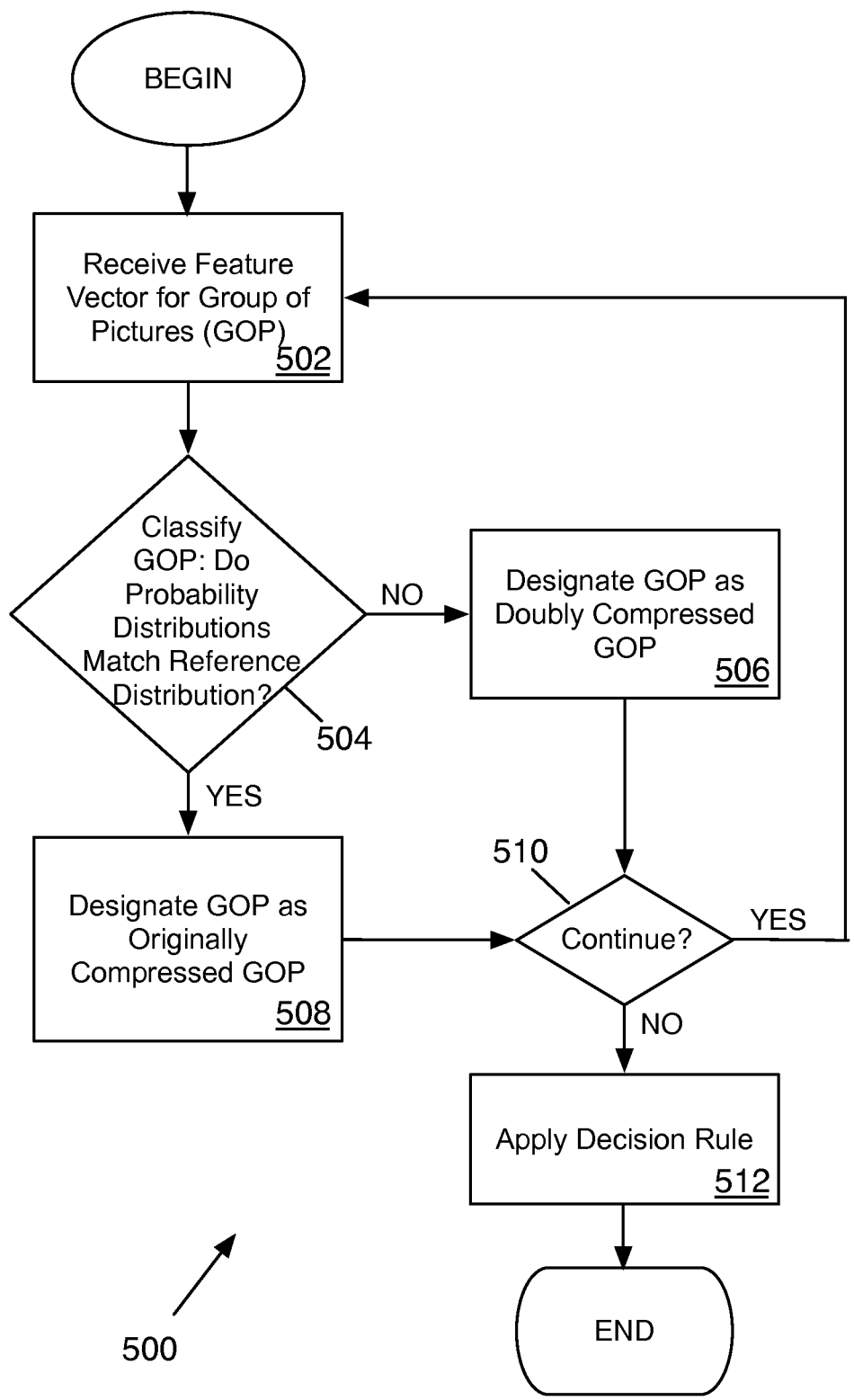
FIG. 5 is a flow chart illustrating an example process for the classification of GOP feature vectors.

FIG. 5 illustrates an example process 500, in accordance with the present disclosure, for the classification of GOP feature vectors. Process 500 may begin with the receipt of a GOP feature vector (block 502). For example, in some implementations, block 502 may correspond with receiving a GOP feature vector that includes an I frame feature vector, an averaged P frame feature vector and an averaged B frame feature vector, where each of the I, B and P feature vectors may include a first digit based probability distribution and corresponding statistical parameters such as an SSE value, an RMSE value and/or an R-Squared value.

Process 500 may continue with classification of the GOP in block 504. Block 504 may include determining whether the probability distributions included in the feature vector received in block 502 match a reference distribution. In some implementations, the reference distribution may be a parametric logarithmic distribution. Further, in some implementations, block 504 may involve comparing the statistical parameter values to one or more threshold parameters. In some implementations, if one or more of the statistical parameter values exceed the threshold value, then process 500 may continue with designation of the GOP as being at least doubly compressed (block 506). For example, in some implementations, an SSE value and/or an RMSE value may be compared, in block 504, to a threshold value of, for example, 0.05 and, if the SSE value and/or an RMSE value exceeds the threshold value then the GOP may be designated as doubly compressed in block 506. For another example, in some implementations, an R-Squared value may be compared, in block 504, to a threshold value of, for example, 0.95 and, if the R-Squared value does not exceed the threshold value then the GOP may be designated as doubly compressed in block 506.

If, on the other hand, the probability distributions are determined to match the reference function, then, in block 508, the GOP corresponding to the quantized coefficients received in block 502 may be designated as a singly or an originally compressed GOP. Process 500 may continue from either of blocks 506 or 508 to block 510, where a determination may be made as to whether additional GOP feature vectors associated with additional GOPs are to be analyzed. If additional GOP feature vectors are to be analyzed then process 500 may continue processing at block 502. If, on the other hand, additional GOP feature vectors are not to be analyzed, then process 500 may proceed to the application of a decision rule in block 512. For example, if an MPEG video sequence including ten GOPs corresponding to ten GOP feature vectors is to be classified, then blocks 502-510 may be selectively undertaken for each GOP feature vector, and block 512 may be undertaken in response to the classification of those ten GOP feature vectors.

In some implementations, block 512 may include dividing the total number of doubly compressed GOPs designated in block 506 by the total number GOPs designated in both blocks 506 and 508 (in other words the total number of GOP feature vectors analyzed by process 500) and then comparing the resulting value to a predetermined value. For example, if three GOPs of an MPEG bitstream having ten GOPs are designated as doubly compressed in block 506 and seven GOPs of the bitstream are designated as originally compressed in block 508, then block 512 may involve comparing the value 0.3 to a predetermined value. For example, if a predetermined value of 0.4 is employed, then a comparison of the derived value of 0.3 to the predetermined value of 0.4 may result in the decision, in block 512, that the MPEG bitstream may not have been subjected to multiple instances of compression.

In another example, six GOPs of an MPEG bitstream having ten GOPs may be designated as doubly compressed in block 506 and four GOPs of the bitstream may be designated as originally compressed in block 508. For this example, block 512 may involve comparing the value 0.6 to a predetermined value. If, as in the above example, a predetermined value of 0.4 is employed, then a comparison of the derived value of 0.6 to the predetermined value of 0.4 may result in the decision, in block 512, that the MPEG bitstream may have been subjected to multiple instances of compression. In other words, that the bitstream may be considered as a tampered bitstream. The preceding examples have been provided merely for illustrative purposes and should not be construed to limit claimed subject matter to particular video sequences, threshold ratios or values, etc.

While in the implementations discussed above, feature vectors are described as being formulated in processes 100 and 400, and as being analyzed in process 500, claimed subject matter is not limited to the formation and/or analysis of feature vectors. Hence, those skilled in the art, in light of the present disclosure, will recognize that the detection of double compression in MPEG video may be undertaken without the generation of feature vectors. Thus, for example, a device or system, employing, for example, a processor or a set of processing elements, may undertake blocks 102, 104 and 106 and 107 of process 100 to determine whether, based on a GOP, or based on a set of GOPs, an MPEG bitstream has been subject to multiple instances of compression. Further, while one device or system may undertake blocks 102-104 of process 100 to determine probability distribution(s) associated with video frames of one or more GOPs, that device or system may convey the determined probability distribution(s) to another device or system that may then undertake blocks 106, 107 and/or 108 of process 100 to determine whether a corresponding MPEG bitstream has been subject to multiple instances of compression.

Figure 6:
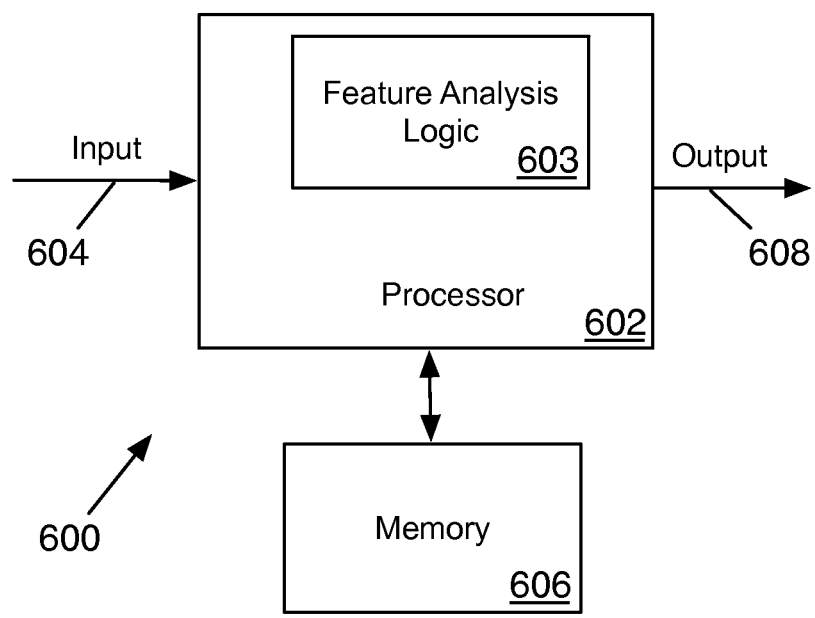
FIG. 6 is a block diagram illustrating an example system suitable for undertaking one or more of the described processes.

FIG. 6 is a block diagram illustrating an example apparatus or device 600 that may be suitable for undertaking any one or all of processes 100, 200, 400 and/or 500 in accordance with the present disclosure. Device 600 is presented herein as an example and claimed subject matter is not limited to the components of device 600. Device 600 includes a processor 602 that may be configured to undertake Variable Length Coding (VLC) decoding of an input video bitstream 604 in addition to other processes described herein. Processor 602 may use memory 606 during the VLC decoding process to store, for example, quantized coefficients, data related to quantized coefficients, etc. Processor 602 may also use memory 606 to store data vectors, probability distributions, statistical parameter values, averages of such values, threshold values etc. Memory 606 may be of any type including but not limited to volatile memory (such as RAM), non-volatile memory (such as ROM, flash memory, etc.) or any combination thereof.

In the context of process 100, processor 602 may, in some implementations, be a general purpose processor configured to undertake all or any subset of blocks 102-108. In the context of process 500, processor 602 may, in some implementations, be a general purpose processor configured to undertake all or any subset of blocks 502-512. Although claimed subject matter is not limited in this regard, processor 602 may include dedicated sequencers, general purpose microprocessors and/or digital signal processors or any combination thereof capable of providing the functionality described herein. Further, processor 602 may also include dedicated feature analysis logic 603 that may be configured to undertake one or more blocks of the processes disclosed herein. For example, referring to process 100, logic 603 may undertake blocks 104-108 to generate a GOP feature vector as the output 608 of processor 602 in response to a bitstream received processor 602 via input 604. For another example, referring to process 500, logic 603 may undertake blocks 502-512 in response to GOP feature vectors received as input 604 to processor 602.

FIG. 7 is a block diagram illustrating an example computer program product 700 arranged in accordance with the present disclosure. Program product 700 may include a signal bearing medium 702. Signal bearing medium 702 may include one or more instructions 704 that, when executed by, for example, a processor, may provide the functionality described above with respect to FIGS. 1-2 and FIGS. 4-6. Thus, for example, referring to the system of FIG. 6, logic 603 of processor 602 may undertake one or more of the blocks shown in FIGS. 1-2 and FIGS. 4-5 in response to instructions 604 conveyed to processor 602 by medium 602.

In some implementations, signal bearing medium 702 may encompass a computer-readable medium 706, such as, but not limited to, a hard disk drive, a Compact Disc (CD), a Digital Video Disk (DVD), a digital tape, memory, etc. In some implementations, signal bearing medium 702 may encompass a recordable medium 708, such as, but not limited to, memory, read/write (R/W) CDs, R/W DVDs, etc. In some implementations, signal bearing medium 702 may encompass a communications medium 710, such as, but not limited to, a digital and/or an analog communication medium (e.g., a fiber optic cable, a waveguide, a wired communications link, a wireless communication link, etc.). Thus, for example, referring to the device of FIG. 6, program product 700 may be conveyed to processor 602 (via an antenna and wireless transceiver not shown in FIG. 6) by an RF signal bearing medium 702, where the signal bearing medium 702 is conveyed to device 600 by a wireless communications medium 710 (e.g., an wireless communications medium conforming with the 802.11 standard).

Figure 8:
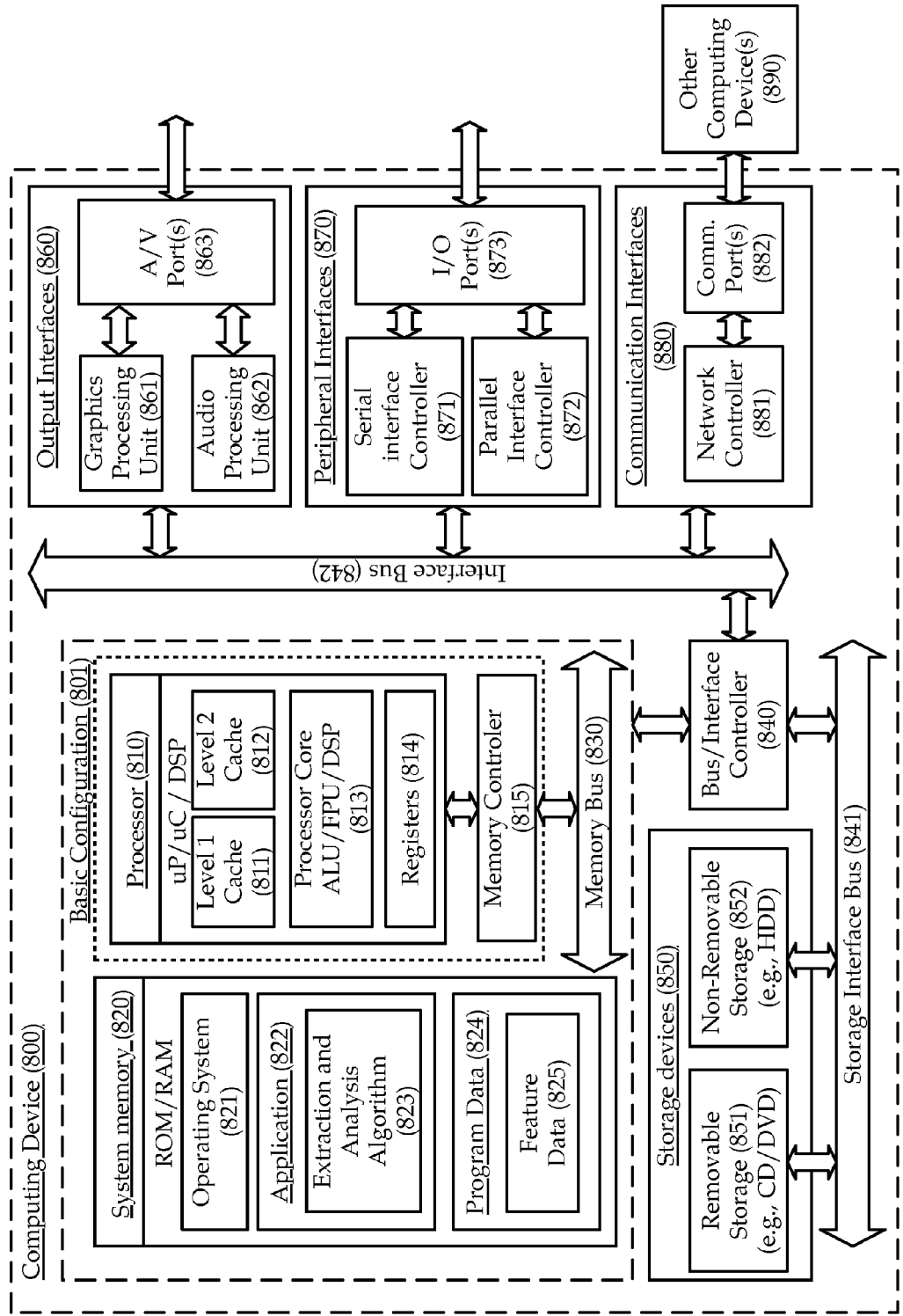
FIG. 8 is a block diagram illustrating an example computing device, all arranged in accordance with the present disclosure.

FIG. 8 is a block diagram illustrating an example computing device 800 that may be arranged for detection of double video compression using digit based statistics in accordance with the present disclosure. In a very basic configuration 801, computing device 800 may include one or more processors 810 and system memory 820. A memory bus 830 may be used for communicating between the processor 810 and the system memory 820.

Depending on the desired configuration, processor 810 may be of any type including but not limited to a microprocessor (µP), a microcontroller (µC), a digital signal processor (DSP), or any combination thereof. Processor 810 may include one or more levels of caching, such as a level one cache 811 and a level two cache 812, a processor core 813, and registers 814. The processor core 813 may include an arithmetic logic unit (ALU), a floating point unit (FPU), a digital signal processing core (DSP Core), or any combination thereof. A memory controller 815 may also be used with the processor 810, or in some implementations the memory controller 815 may be an internal part of the processor 810.

Depending on the desired configuration, the system memory 820 may be of any type including but not limited to volatile memory (such as RAM), non-volatile memory (such as ROM, flash memory, etc.) or any combination thereof. System memory 820 may include one or more of an operating system 821, one or more applications 822, and program data 824. Application 822 may include a feature extraction and analysis algorithm 823 that may be arranged to perform the functions as described herein including the functional blocks described with respect to processes FIGS. 1-2 and FIGS. 4-5. Program Data 824 may include feature data 825, for example, probability distributions, statistical parameter value. etc, which may be useful for implementing feature extraction and analysis algorithm 823. In some example embodiments, application 822 may be arranged to operate with program data 824 on an operating system 821 such that implementations of detection of double MPEG video compression using first digit based statistics may be provided as described herein. This described basic configuration is illustrated in FIG. 8 by those components within dashed line 801.

Computing device 800 may have additional features or functionality, and additional interfaces to facilitate communications between the basic configuration 801 and any required devices and interfaces. For example, a bus/interface controller 840 may be used to facilitate communications between the basic configuration 801 and one or more data storage devices 850 via a storage interface bus 841. The data storage devices 850 may be removable storage devices 851, non-removable storage devices 852, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 820, removable storage 851 and non-removable storage 852 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 800. Any such computer storage media may be part of device 800.

Computing device 800 may also include an interface bus 842 for facilitating communication from various interface devices (e.g., output interfaces, peripheral interfaces, and communication interfaces) to the basic configuration 801 via the bus/interface controller 840. Example output interfaces 860 include a graphics processing unit 861 and an audio processing unit 862, which may be configured to communicate to various external devices such as a display or speakers via one or more A/V ports 863. Example peripheral interfaces 860 include a serial interface controller 871 or a parallel interface controller 872, which may be configured to communicate with external devices such as input devices (e.g., keyboard, mouse, pen, voice input device, touch input device, etc.) or other peripheral devices (e.g., printer, scanner, etc.) via one or more I/O ports 873. An example communication interface 880 includes a network controller 881, which may be arranged to facilitate communications with one or more other computing devices 890 over a network communication via one or more communication ports 882. A communication connection is one example of a communication media. Communication media may be embodied by computer readable instructions, data structures, program modules, or other data in a modulated data signal, such as a carrier wave or other transport mechanism, and includes any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), infrared (IR) and other wireless media. The term computer readable media as used herein may include both storage media and communication media.

Computing device 800 may be implemented as a portion of a small-form factor portable (or mobile) electronic device such as a cell phone, a personal data assistant (PDA), a personal media player device, a wireless web-watch device, a personal headset device, an application specific device, or a hybrid device that includes any of the above functions. Computing device 800 may also be implemented as a personal computer including both laptop computer and non-laptop computer configurations.

Claimed subject matter is not limited in scope to the particular implementations described herein. For example, some implementations may be in hardware, such as employed to operate on a device or combination of devices, for example, whereas other implementations may be in software and/or firmware. Likewise, although claimed subject matter is not limited in scope in this respect, some implementations may include one or more articles, such as a storage medium or storage media. This storage media, such as CD-ROMs, computer disks, flash memory, or the like, for example, may have instructions stored thereon, that, when executed by a system, such as a computer system, computing platform, or other system, for example, may result in execution of a processor in accordance with claimed subject matter, such as one of the implementations previously described, for example. As one possibility, a computing platform may include one or more processing units or processors, one or more input/output devices, such as a display, a keyboard and/or a mouse, and one or more memories, such as static random access memory, dynamic random access memory, flash memory, and/or a hard drive.

Reference in the specification to "an implementation," "one implementation," "some implementations," or "other implementations" may mean that a particular feature, structure, or characteristic described in connection with one or more implementations may be included in at least some implementations, but not necessarily in all implementations. The various appearances of "an implementation," "one implementation," or "some implementations" in the preceding description are not necessarily all referring to the same implementations. Moreover, when terms or phrases such as "coupled" or "responsive" or "in response to" or "in communication with", etc. are used herein or in the claims that follow, these terms should be interpreted broadly. For example, the phrase "coupled to" may refer to being communicatively, electrically and/or operatively coupled as appropriate for the context in which the phrase is used.

In the preceding description, various aspects of claimed subject matter have been described. For purposes of explanation, specific numbers, systems and/or configurations were set forth to provide a thorough understanding of claimed subject matter. However, it should be apparent to one skilled in the art and having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now, or in the future, occur to those skilled in the art. It is, therefore, to be understood that the appended claims are intended to cover all such modifications and/or changes as fall within the true spirit of claimed subject matter.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity; control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed:

1. A method for detecting video tampering with a device, comprising:
   receiving a plurality of data vectors comprising the first digit probability distribution for each video frame of a plurality of video frames for a Group of Pictures (GOP) comprising at least one intra-coded video frame (I video frame), at least one of a plurality of predictive coded video frames (P video frames), and a plurality of bi-directionally predictive coded video frames (B video frames), wherein each of the plurality of video frames is encoded using quantized coefficients associated with the I, P and B video frames;
   generating an average P frame data vector from one or more of the plurality of data vectors that correspond to the at least one P video frames;
   generating an average B frame data vector from the ones of the plurality of data vectors that correspond to the plurality of B video frames;
   generating a combined data vector from the one of the plurality of data vectors that corresponds to the I video frame, the average P frame data vector and the average B frame data vector;
   comparing each of the first digit probability distributions in the combined data vector to one or more reference distributions; and
   determining whether the GOP corresponds to a tampered video bitstream based at least in part upon the comparing each of the first digit probability distributions in the combined data vector to the one or more reference distributions.

2. The method of claim 1, wherein the GOP comprises at least a portion of an Motion Picture Experts Group (MPEG) video sequence.

3. The method of claim 2, wherein the MPEG video sequence comprises a video sequence encoded using constant bit rate control.

4. The method of claim 1, wherein the quantized coefficients comprise non-zero quantized AC coefficients.

5. The method of claim 1, wherein the intra-coded, predictive coded and/or bi-directionally predictive coded video frames comprise luminance video frames.

6. The method of claim 1, wherein the data vector also comprises values of at least one statistical parameter associated with each of the plurality of probability distributions, and wherein comparing the plurality of probability distributions to one or more reference distributions comprises comparing the values of the at least one statistical parameter to one or more threshold values.

7. A device for detecting video tampering, comprising:
processing logic configured to:
receive a plurality of video frames of a Group of Pictures (GOP) comprising at least one intra-coded video frame (I video frame), at least one of a plurality of predictive coded video frames (P video frames), and a plurality of bi-directionally predictive coded video frames (B video frames), wherein each of the plurality of video frames is encoded using quantized coefficients associated with the I, P and B video frames;
determine a first digit probability distribution for the I video frame;
determine an average first digit probability distribution for the one or more P video frames;
determine an average first digit probability distribution for the plurality of B video frames;
compare the determined first digit probability distribution and the determined average first digit probability distributions to one or more reference distributions; and
determine whether the GOP corresponds to a tampered video bitstream based at least in part upon the comparing the determined first digit probability distribution and the determined average first digit probability distributions to the one or more reference distributions.

8. The device of claim 7, wherein the GOP comprises a portion of an Motion Picture Experts Group (MPEG) video sequence, and wherein the MPEG video sequence comprises a video sequence encoded using constant bit rate control.

9. The device of claim 7, wherein the quantized coefficients comprise non-zero quantized AC coefficients.

10. The device of claim 7, wherein the plurality of video frames comprises luminance video frames.

11. The device of claim 7, wherein the one or more reference distributions comprise one or more logarithmic distributions.

12. The device of claim 7, wherein the processing logic is configured to compare the first digit probability distributions to the one or more reference distributions by statistically fitting the probability distributions to the reference distribution.

13. The device of claim 12, wherein statistically fitting comprises determining at least one of a Sum of Squares due to Error (SSE) value, a Root Mean Squared Error (RMSE) value, or an R-squared value.

14. The device of claim 13, wherein the processing logic is further configured to:
generate a data vector including the one or more of the SSE value, the RMSE value, or the R-squared value.

15. The device of claim 14, further comprising:
memory coupled to the processing logic,
wherein the processing logic is further configured to store the data vector in the memory.

16. A machine readable non-transitory medium having stored therein instructions that, when executed by one or more processors, operatively enable a feature analysis logic module to:
determine a first digit probability distribution for an intra-coded video frame (I video frame) of a Group of Pictures (GOP), wherein the GOP includes at least one I video frame, a plurality of predictive coded video frames (P video frames), and a plurality of bi-directionally predictive coded video frames (B video frames), wherein each of the video frames is encoded using quantized coefficients associated with the I, P and B video frames;
determine an average first digit probability distribution for the plurality of P video frames;
determine an average first digit probability distribution for the plurality of B video frames;
compare the determined first digit probability distribution and the determined average first digit probability distributions to one or more reference distributions; and
determine whether the GOP corresponds to a tampered video bitstream based at least in part upon the comparing the determined probability distribution and the determined average probability distributions to the one or more reference distributions.

17. The machine readable non-transitory medium of claim 16, wherein the GOP comprises a portion of an Motion Picture Experts Group (MPEG) video sequence, and wherein the MPEG video sequence comprises a video sequence encoded using constant bit rate control.

18. The machine readable non-transitory medium of claim 16, wherein the quantized coefficients comprise non-zero quantized AC coefficients.

19. The machine readable non-transitory medium of claim 16, wherein the plurality of video frames comprises luminance video frames.

20. The machine readable non-transitory medium of claim 16, wherein the one or more reference distributions comprise one or more logarithmic distributions.

21. The machine readable non-transitory medium of claim 16, wherein the feature analysis logic module is further operatively enabled to:
compare the determined probability distribution and the determined average probability distributions to the one or more reference distributions by statistically fitting the probability distributions to the reference distribution.

22. The machine readable non-transitory medium of claim 21, wherein statistically fitting comprises determining at least one of a Sum of Squares due to Error (SSE) value, a Root Mean Squared Error (RMSE) value, or an R-squared value.

23. The machine readable non-transitory medium of claim 22, wherein the feature analysis logic module is further operatively enabled to:
generate a data vector including the one or more of the SSE value, the RMSE value, or the R-squared value.

* * * * *